United States Patent
Drube et al.

(10) Patent No.: US 12,196,478 B2
(45) Date of Patent: Jan. 14, 2025

(54) VAPORIZER WITH DEFROSTING FUNCTION

(71) Applicant: Chart Inc., Ball Ground, GA (US)

(72) Inventors: Paul Drube, Lakeville, MN (US); Grant Madison, Owatonna, MN (US)

(73) Assignee: Chart Inc., Ball Ground, GA (US)

( * ) Notice: Subject to any disclaimer, the term of this patent is extended or adjusted under 35 U.S.C. 154(b) by 470 days.

(21) Appl. No.: 17/318,323

(22) Filed: May 12, 2021

(65) Prior Publication Data
US 2021/0356196 A1    Nov. 18, 2021

Related U.S. Application Data

(60) Provisional application No. 63/024,063, filed on May 13, 2020.

(51) Int. Cl.
| | | |
|---|---|---|
| *F25D 21/12* | (2006.01) | |
| *F17C 9/02* | (2006.01) | |
| *F17C 13/10* | (2006.01) | |

(52) U.S. Cl.
CPC ............... *F25D 21/12* (2013.01); *F17C 9/02* (2013.01); *F17C 13/10* (2013.01);
(Continued)

(58) Field of Classification Search
CPC .. F25D 21/12; F17C 9/02; F17C 13/10; F17C 2205/0326; F17C 2205/0332; F17C 2205/0335; F17C 2205/0352; F17C 2221/011; F17C 2221/012; F17C 2221/013; F17C 2221/014; F17C 2221/016; F17C 2221/017; F17C 2221/033; F17C 2223/0161; F17C 2223/033;
(Continued)

(56) References Cited

U.S. PATENT DOCUMENTS

| | | | | |
|---|---|---|---|---|
| 8,347,694 B2 * | 1/2013 | Welker | ................. | G01N 1/10 |
| | | | | 73/64.56 |
| 2008/0250795 A1* | 10/2008 | Katdare | ................. | F17C 9/02 |
| | | | | 62/50.2 |
| 2010/0043453 A1 | 2/2010 | Mak | | |

FOREIGN PATENT DOCUMENTS

| | | |
|---|---|---|
| DE | 4025138 A1 | 2/1992 |
| JP | 2005220980 A | 8/2005 |
| KR | 20160067482 A * | 6/2016 |

OTHER PUBLICATIONS

Kim et al., Vaporization Apparatus for Liquid Natural Gas, Jun. 14, 2016, KR20160067482A, Whole Document (Year: 2016).*

(Continued)

*Primary Examiner* — Larry L Furdge
(74) *Attorney, Agent, or Firm* — Cook Alex Ltd.

(57) ABSTRACT

A vaporizer system includes a defrosting function along with the ability to convert liquefied gas to a use gas. The vaporizer system includes first and second vaporizers and piping that transfers fluid from an inlet port to an outlet port with a portion of the piping being between the first and second vaporizer. The system also includes a trim heater and a number of valves for regulating flow of the fluid through the transfer piping. The valves may be placed in a first configuration where vapor from the first vaporizer is heated and directed to the second vaporizer so that the second vaporizer is defrosted and a second configuration where vapor from the second vaporizer is heated and directed to the first vaporizer so that the first vaporizer is defrosted.

7 Claims, 9 Drawing Sheets

(52) U.S. Cl.
CPC ............... *F17C 2205/0326* (2013.01); *F17C 2205/0332* (2013.01); *F17C 2205/0335* (2013.01); *F17C 2205/0352* (2013.01); *F17C 2221/011* (2013.01); *F17C 2221/012* (2013.01); *F17C 2221/013* (2013.01); *F17C 2221/014* (2013.01); *F17C 2221/016* (2013.01); *F17C 2221/017* (2013.01); *F17C 2221/033* (2013.01); *F17C 2223/0161* (2013.01); *F17C 2223/033* (2013.01); *F17C 2225/0123* (2013.01); *F17C 2225/035* (2013.01); *F17C 2227/0304* (2013.01); *F17C 2227/0311* (2013.01); *F17C 2227/0316* (2013.01); *F17C 2227/0393* (2013.01); *F17C 2250/032* (2013.01); *F17C 2250/034* (2013.01); *F17C 2250/043* (2013.01); *F17C 2250/0439* (2013.01); *F17C 2260/032* (2013.01); *F17C 2265/05* (2013.01); *Y02E 60/32* (2013.01)

(58) Field of Classification Search
CPC ...... F17C 2225/0123; F17C 2225/0304; F17C 2227/0304; F17C 2227/0311; F17C 2227/0316; F17C 2227/0393; F17C 2250/032; F17C 2250/034; F17C 2250/043; F17C 2250/0439; F17C 2260/032; F17C 2265/05; Y02E 60/32
See application file for complete search history.

(56) References Cited

OTHER PUBLICATIONS

Notification of Transmittal of the International Search Report and Written Opinion of the International Searching Authority dated Aug. 6, 2021 for International Application No. PCT/US2021/032149.

* cited by examiner

VAPORIZER WITH DEFROSTING FUNCTION

CLAIM OF PRIORITY

This application claims the benefit of U.S. Provisional Application No. 63/024,063, filed May 13, 2020, the contents of which are hereby incorporated by reference.

FIELD OF THE DISCLOSURE

The present disclosure relates generally to vaporizers for cryogenic fluids and, more particularly, to a vaporizer with a defrosting function for use with a cryogenic tank or system for converting liquefied gas to use gas.

BACKGROUND

Industrial gases, such as natural gas, are advantageously stored or transported in a liquid state because they occupy a much smaller volume (natural gas for instance is $1/600^{th}$ the gaseous state). The liquified gases are then vaporized back to a gaseous state for use at a site or system.

Various types of vaporizers can be used to convert this liquefied gas to a gaseous use state. Cryogenic systems may utilize ambient air, circulating water, electric, fuel-fired, steam, or water bath vaporizers. Ambient air vaporizers are desirable due to low maintenance requirements and lack of impact on the environment. Ambient air vaporizers utilize jets or fans to drive air to warm liquified gases and transition them to a gas state.

When the cooled liquid (in the case of natural gas ~−160° C.) enters the ambient air vaporizer(s) and vaporizer system, frost or ice can build up on the exterior surface of the vaporizer(s) due to the interaction with the moist ambient air. Prolonged freezing or frost can lead to damage to the vaporizer and piping of the vaporizer system and can also negatively impact the coil performance and heat transfer.

It is desirable to provide a vaporizer system with an effective defrosting function to provide a solution for frosted and/or frozen vaporizers and/or vaporizer systems and convert liquefied gas to use gas.

SUMMARY OF THE DISCLOSURE

There are several aspects of the present subject matter which may be embodied separately or together in the methods, devices and systems described and claimed below. These aspects may be employed alone or in combination with other aspects of the subject matter described herein, and the description of these aspects together is not intended to preclude the use of these aspects separately or the claiming of such aspects separately or in different combinations as set forth in the claims appended hereto.

In one aspect, a vaporizer system includes a first vaporizer, a second vaporizer, piping, at least one trim heater, and a plurality of valves. The piping is configured to transfer fluid from an inlet port to an outlet port with a portion of the piping between the first and second vaporizer. The plurality of valves is for regulating flow of the fluid through the piping. The valves may be placed in a first configuration where vapor from the first vaporizer is heated and directed to the second vaporizer so that the second vaporizer is defrosted and a second configuration where vapor from the second vaporizer is heated and directed to the first vaporizer so that the first vaporizer is defrosted.

In another aspect, a method of defrosting a vaporizer in a vaporizer system having at least a first vaporizer and a second vaporizer includes placing a plurality of valves of the vaporizer system in a first configuration, directing a fluid from the inlet port of the system through the first vaporizer and a trim heater to produce a first heated fluid, defrosting the second vaporizer by passing the first heated fluid through the second vaporizer, and directing the first heated fluid to the outlet port of the system, placing a plurality of valves of the vaporize system in a second configuration, directing a fluid from the inlet port through the second vaporizer and a trim heater to produce a second heated fluid, defrosting the first vaporizer by passing the second heated fluid through the first vaporizer, and directing the second heated fluid to the outlet port of the system.

DETAILED DESCRIPTION OF EMBODIMENTS

An embodiment of the disclosure provides a vaporizer system with a defrosting function, eliminating the issue of frozen or frosted vaporizers. The vaporizer also functions to convert a liquefied gas to a gas for use in a cryogenic system.

Figure 1:
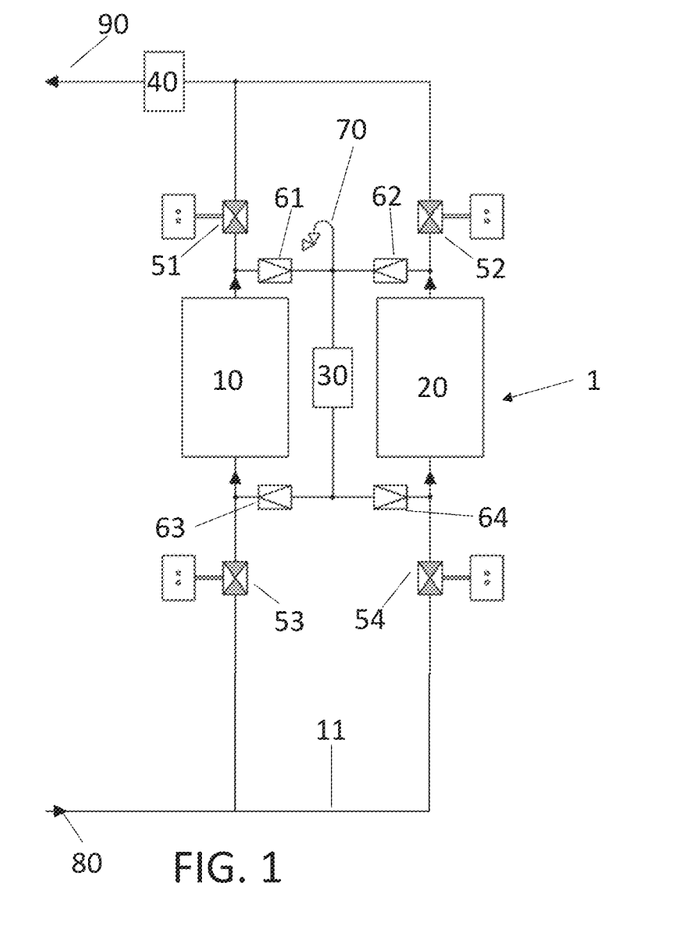
FIG. 1 is a schematic illustration of one embodiment of a vaporizer system of the current disclosure.

A first embodiment of the vaporizer system of the current disclosure is indicated in general at 1 in FIG. 1. Vaporizer system 1 has a first vaporizer 10 and a second vaporizer 20. Although two vaporizers are shown, more vaporizers can be included in vaporizer system 1.

Vaporizer system 1 includes piping 11 connecting various components of the system. The piping can be of any suitable material for handling the range of temperatures, including, but not limited to metals or plastics. In certain embodiments, the piping may be insulated. The cross-sections of this pipe and other structures can have various shapes, such as a circle, ellipsis, square, triangle, pentagon, hexagon, polygon, and other shapes. The piping includes an inlet port 80 and an outlet port 90. Although specific detail is not shown in the figures, both pipe inlet and outlet ports (80 and 90) can feature a number of specific fittings. For instance, each other may comprise a removable and reusable seal. Each outlet may also include a valve or vent.

Vaporizer system 1 includes a number of valves including inner valves 61, 62, 63, and 64 and outer valves 51, 52, 53 and 54. The inner and outer valves can be a number of different types of valves.

Inner valves 61, 62, 63 and 64 can be one-way or check valves, allowing fluid to flow in one direction. The valves can have two openings, one for fluid to flow in and one for it to flow out of. As shown in FIG. 1, valves 61 and 62 permit fluid to flow inward and valves 63 and 64 permit fluid to flow outward. Fluid will flow to one valve versus the other due to the pressure differentials across the valves. If there is higher pressure on the outlet side of the valve than on the inlet side, it will be closed. As examples only, the valves can be, but are not limited to, ball check valves, tilting disk check valves, swing-check or stop-check valves.

Outer valves 51, 52, 53 and 54 can be isolation valves, regulating the flow of fluid in a pipeline. The valve can function to start and stop the flow of liquid when desired. This function can be done by an open/closed setting. There are a number of different types of isolation valves that can be used. As examples only, the isolation valves may be, but are not limited to, globe valves, ball valves and gate valves. In certain embodiments, globe valves are utilized.

Vaporizer system 1 also includes at least one trim heater 30. Vaporizer system 1 can also include an optional trim heater 40. The trim heater 30 can be positioned along a portion of the piping 11 between vaporizers 10 and 20. Trim heaters 30 and 40 can be any effective heater type. The trim heaters can be electric, gas, air or liquid based heaters. In one embodiment of the current disclosure, the trim heaters are electric heaters.

Vaporizer system 1 can also include one or more line safety devices 70. Line safety device 70 may be a vent or valve system activated when pressure within the system builds up and requires a release. These vents or valves can be located along the vaporizer system at various points and in the case of vents can vent directly to the atmosphere or directed through additional piping for further processing.

A control system may include a controller and optionally various sensors (such as pressure and temperature sensors) positioned on or in the system. The controller may be utilized to control various parts of the vaporizer system such as the trim heaters, valves, inlet ports, and outlet ports of the vaporizer system. The controller may be wired or wireless and is in communication with the optional sensors and those portions of the systems that it controls. The controller includes a processor or other computer device and can be programmable so as to regulate or initiate processes upon certain events or status information, including placing the system in the configurations described below. The controller may also provide information such as historical data or various types of indications to a user.

Although not shown in the figures, a cryogenic tank or tanks may be connected at inlet port 80 to serve as a liquid source and a gas destination. The cryogenic tank may store a variety of cryogenic liquids. For example, the cryogenic liquids can be at least one of nitrogen, helium, neon, argon, krypton, carbon dioxide, hydrogen, liquefied natural gas and oxygen, although other types of gases are within the scope of this disclosure. In a preferred embodiment cryogenic tank is used for storing liquefied natural gas. The cryogenic tank supplies cryogenic liquid to the inlet port 80 and the vaporizer system can direct a resulting use gas to a process or use device through the outlet port 90.

Inlet and outlet ports 80 and 90 of vaporizer system 1 may be connected to the cryogenic tank or tanks (or other liquid source) and/or use device(s) by flexible hoses. As an alternative to flexible hoses, pipes of the system may be connected to tanks, process(es) and/or use devices by any other known connection means, including, but not limited to, insulated piping. The connection means may be permanent or temporary and can consist of any piping, tube, hose or appropriate conduit. In addition, the inlet and outlet ports 80 and 90 of the vaporizer system 1 can be connected to tank(s), use device(s) and/or process(es) by lines that include one or more valves to direct fluid.

Vaporizer system 1 may include devices or gauges for reading different characteristics of the tank. These devices or gauges can show pressure, temperature, differential pressure, liquid level, etc. The devices or gauges can be in communication with the controller and trigger actions upon certain levels or readings.

Figure 2:
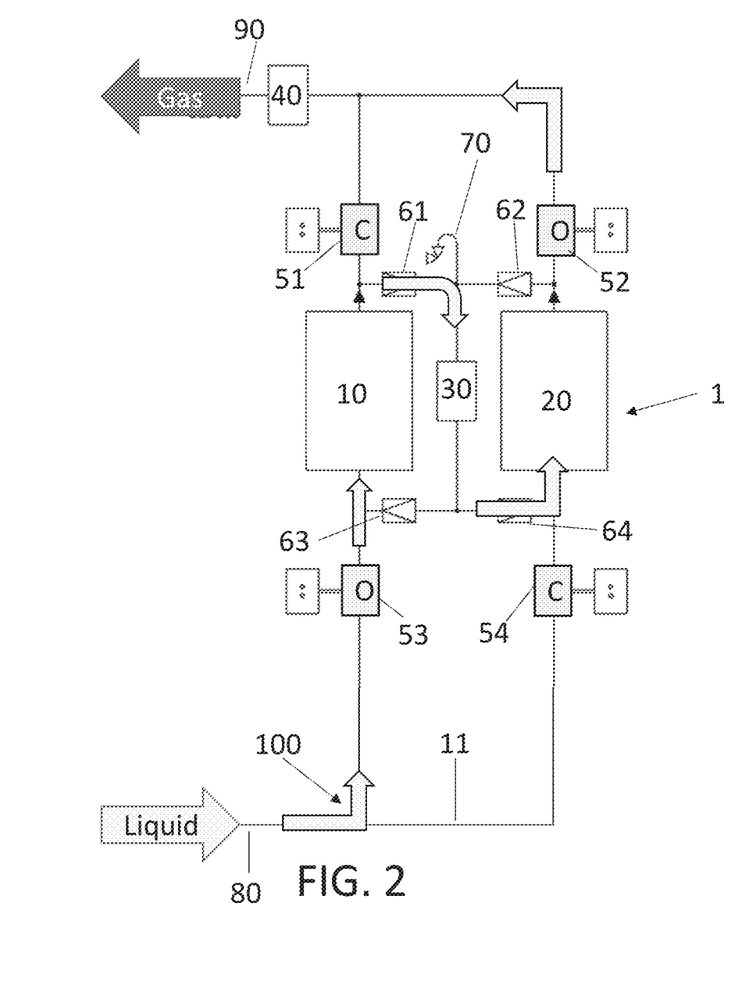
FIG. 2 is a schematic illustration of one embodiment of a defrosting operation of the vaporizer system of FIG. 1 of the current disclosure.

FIG. 2 illustrates a first defrosting configuration of the vaporizer system 1 of the current disclosure, with the direction of fluid flow shown by the arrows 100. Valves 51 and 54 are closed. When vaporizer 20 needs to be defrosted and liquid converted to gas, a liquid source (such as a cryogenic liquid tank) provides liquid at inlet port 80. The liquid passes through piping 11 and open outside valve 53 to vaporizer 10. The liquid is vaporized and becomes gas through vaporizer 10 and is directed through inside valve 61 toward trim heater 30. Gas is heated at trim heater 30 and passes through inside valve 64 to vaporizer 20. The warmed gas defrosts vaporizer 20 and flows through open outside valve 52 towards outlet 90. The gas may pass through optional trim heater 40 and exit at port outlet 90 as a gas at the appropriate temperature. In one embodiment, the appropriate temperature is about 70° F.

Figure 3:
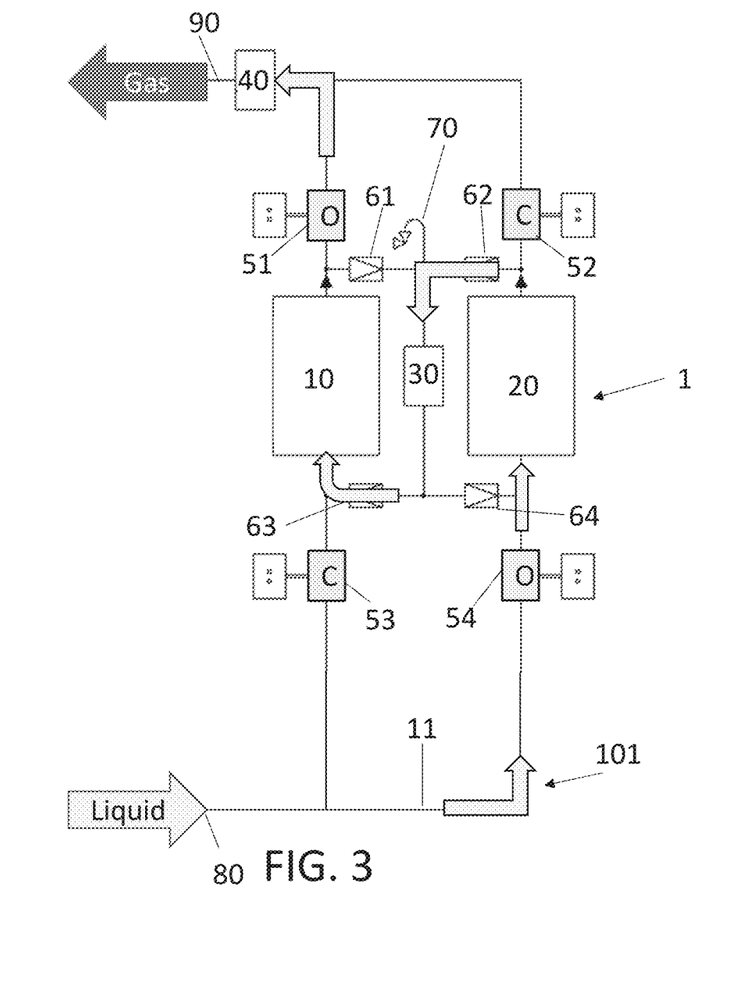
FIG. 3 is a schematic illustration of one embodiment of a defrosting operation of the vaporizer system of FIG. 1 of the current disclosure.

FIG. 3 illustrates a second defrosting configuration of the vaporizer system 1 of the current disclosure, with the flow of fluid shown by the arrows 101. Valves 52 and 53 are closed. When vaporizer 10 needs to be defrosted and liquid converted to gas, liquid source provides liquid at inlet port 80. The liquid passes through piping 11 and open outside valve 54 to vaporizer 20. The liquid is vaporized and becomes gas through vaporizer 20 and is directed through inside valve 62 toward trim heater 30. Gas is heated at trim heater 30 and passes through inside valve 63 to vaporizer 10. The warmed gas defrosts vaporizer 10 and flows through open outside valve 51 toward outlet 90. The gas may pass through optional trim heater 40 and exit at port outlet 90 as a gas at the appropriate temperature. In one embodiment, the appropriate temperature is approximately 70° F.

Figure 4:
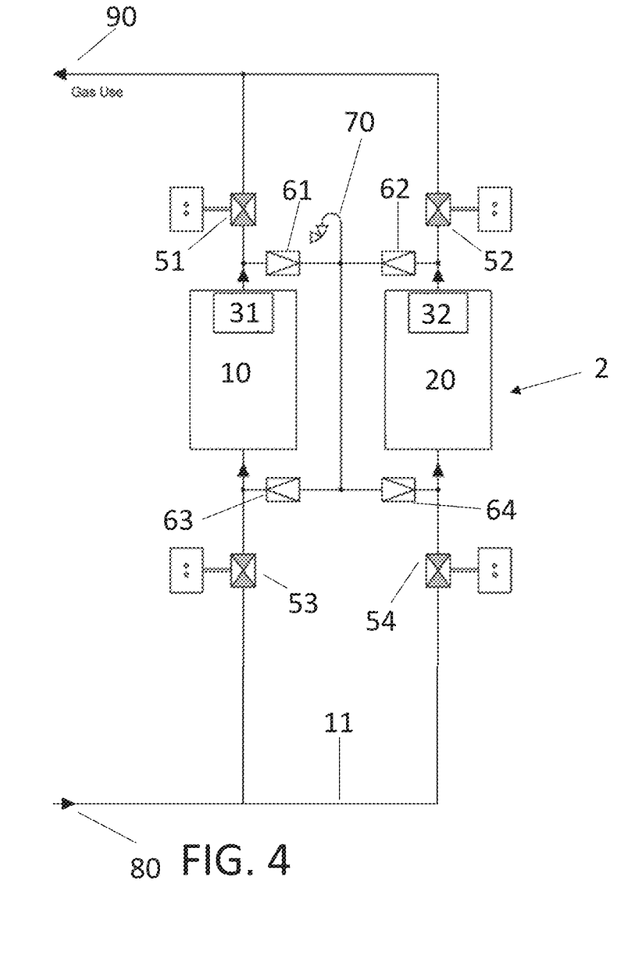
FIG. 4 is a schematic illustration of another embodiment of a vaporizer system of the current disclosure.

A second embodiment of the vaporizer system of the current disclosure is indicated in general at 2 in FIG. 4. Vaporizer system 2 has a first vaporizer 10 and a second vaporizer 20. Although two vaporizers are shown, more vaporizers can be included in vaporizer system 2.

Vaporizer system 2 includes piping 11 connecting various components of the system. The piping can be of any suitable material for handling the range of temperatures, including, but not limited to metals or plastics. In certain embodiments, the piping may be insulated. The cross-sections of this pipe and other structures can have various shapes, such as a circle, ellipsis, square, triangle, pentagon, hexagon, polygon, and other shapes. The piping includes an inlet port 80 and an outlet port 90. Although specific detail is not shown in the figures, both pipe inlet and outlet ports 80 and 90 can feature a number of specific fittings. For instance, each other may comprise a removable and reusable seal. Each outlet may also include a valve or vent.

Vaporizer system 2 includes a number of valves including inner valves 61, 62, 63, and 64 and outer valves 51, 52, 53 and 54. The inner and outer valves can be a number of different types of valves.

Inner valves 61, 62, 63 and 64 can be one-way or check valves, allowing fluid to flow in one direction. The valves can have two openings, one for fluid to flow in and one for it to flow out of. As shown in FIG. 4, valves 61 and 62 permit fluid to flow inward and valves 63 and 64 permit fluid to flow outward. Fluid will flow to one valve versus the other due to the pressure differentials across the valves. If there is higher pressure on the outlet side of the valve than on the inlet side, it will be closed. As examples only, the valves can be, but are not limited to, ball check valves, tilting disk check valves, swing-check or stop-check valves.

Outer valves 51, 52, 53 and 54 can be isolation valves, regulating the flow of fluid in a pipeline. The valve can function to start and stop the flow of liquid when desired. This function can be done by an open/closed setting. There are a number of different types of isolation valves that can be used. As examples only, the isolation valves may be but are not limited to, globe valves, ball valves and gate valves. In certain embodiments, globe valves are utilized.

Vaporizer system 2 also includes at least one trim heater. Vaporizer system 2 can utilize two trim heaters 31 and 32. Trim heaters 31 and 32 can be any effective heater type. As shown in FIG. 4, vaporizers 10 and 20 may each have a trim heater (31&32) positioned within the vaporizer. Although the trim heaters are shown near the top of the vaporizers, the trim heaters can be arranged in multiple ways within the vaporizers. The trim heaters can be electric, gas, air or liquid based heaters. In one embodiment of the current disclosure, the trim heaters are electric heaters.

Vaporizer system can also include one or more line safety devices 70. Line safety device 70 may be a vent or valve system activated when pressure within the system builds up and requires a release. These vents or valves can be located along the vaporizer system at various points and in the case of vents can vent directly to the atmosphere or directed through additional piping for further processing.

A controller system may include a controller and optionally various sensors (such as pressure and temperature sensors) positioned on or in the system. The controller may be utilized to control various parts of the vaporizer system such as the trim heaters, valves, inlet ports, and outlet ports of the vaporizer system. The controller may be wired or wireless and is in communication with the optional sensors and those portions of the systems that it controls. The controller includes a processor or other computer device and can be programmable so as to regulate or initiate processes upon certain events or status information, including placing the system in the configurations described below. The controller may also provide information such as historical data or various types of indications to a user.

Although not shown in the figures, a cryogenic tank or tanks may be connected at inlet port 80 to serve as a liquid source and a gas destination. The cryogenic tank may store a variety of cryogenic liquids. For example, the cryogenic liquid can be at least one of nitrogen, helium, neon, argon, krypton, carbon dioxide, hydrogen, liquefied natural gas and oxygen, although other types of gases are within the scope of this disclosure. In a preferred embodiment, the cryogenic tank is used for storing liquefied natural gas. The cryogenic tank supplies cryogenic liquid to the inlet port 80 and the vaporizer system can direct a resulting use gas to a process or use device through the outlet port 90.

Inlet and outlet ports 80 and 90 of vaporizer system 2 may be connected to the cryogenic tank or tanks (or other liquid source) and/or use device(s) by flexible hoses. As an alternative to flexible hoses, pipes of the system may be connected to tanks, process(es) and/or use devices by any other known connection means, including, but not limited to, insulated piping. The connection means may be permanent or temporary and can consist of any piping, tube, hose or appropriate conduit. In addition, the inlet and outlet ports 80 and 90 of the vaporizer system 2 can be connected to tank(s), use device(s) and/or process(es) by lines that include one or more valves to direct fluid.

Vaporizer system 2 may include devices or gauges for reading different characteristics of the tank. These devices or gauges can show pressure, temperature, differential pressure, liquid level, etc. The devices or gauges can be in communication with the controller and trigger actions upon certain levels or readings.

Figure 5:
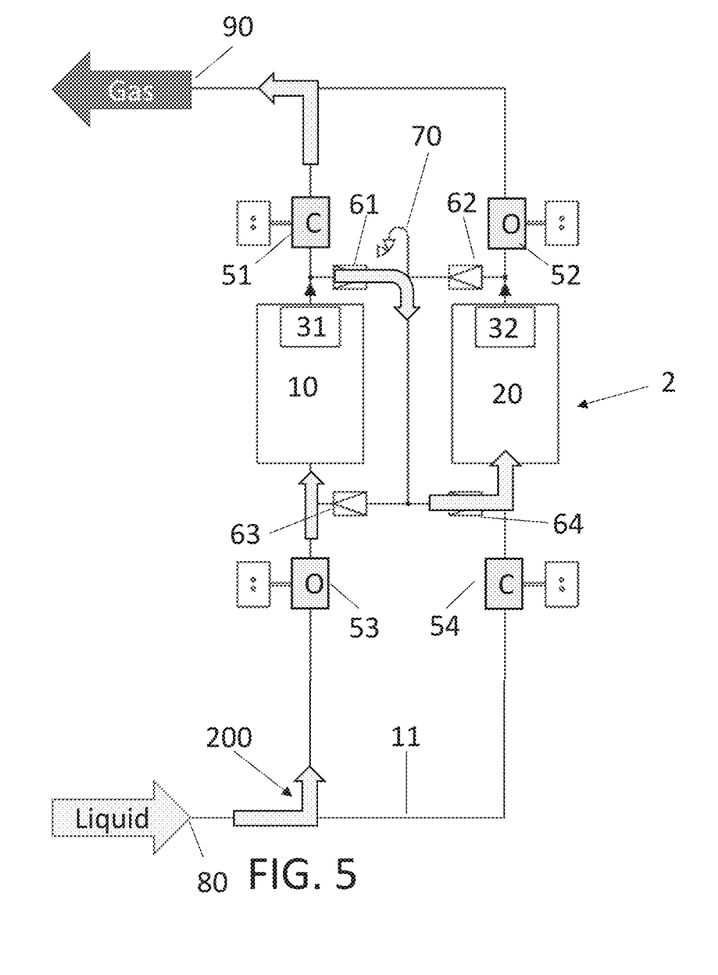
FIG. 5 is a schematic illustration of one embodiment of a defrosting operation of the vaporizer system of FIG. 4 of the current disclosure.

FIG. 5 illustrates a first defrosting configuration of the vaporizer system 2 of the current disclosure, with the direction of fluid flow shown by the arrows 200. Valves 51 and 54 are closed. When vaporizer 20 needs to be defrosted and liquid converted to gas, a liquid source (such as a cryogenic liquid tank) provides liquid at inlet port 80. The liquid passes through piping 11 and open outside valve 53 to vaporizer 10. The liquid is vaporized and becomes gas through vaporizer 10 and is warmed by trim heater 31. The gas is then directed through inside valve 61 toward vaporizer 20. Gas passes through inside valve 64 to vaporizer 20. The warmed gas defrosts vaporizer 20 and is heated with second trim heater 32. The warmed gas then flows through open outside valve 52 towards outlet 90. The gas exits at port outlet 90 as a gas at the appropriate temperature. In one embodiment, the appropriate temperature is about 70° F.

Figure 6:
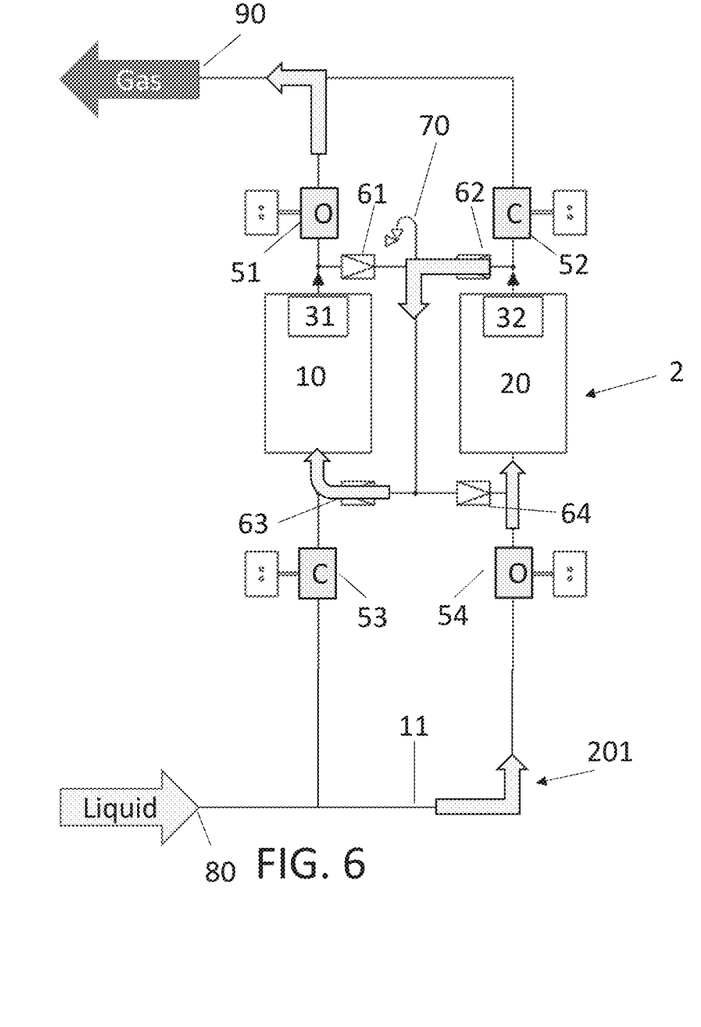
FIG. 6 is a schematic illustration of one embodiment of a defrosting operation of the vaporizer system of FIG. 4 of the current disclosure.

FIG. 6 illustrates a second defrosting configuration of the vaporizer system 2 of the current disclosure, with the flow of fluid shown by the arrows 201. Valves 52 and 53 are closed. When vaporizer 10 needs to be defrosted and liquid converted to gas, a liquid source (such as a cryogenic liquid tank) provides liquid at inlet port 80. The liquid passes through piping 11 and open outside valve 54 to vaporizer 20. The liquid is vaporized and becomes gas through vaporizer 20 and is warmed by trim heater 32. The gas is then directed through inside valve 62 toward vaporizer 10. Gas passes through inside valve 63 to vaporizer 20. The warmed gas defrosts vaporizer 20 and is heated with trim heater 31. The warmed gas then flows through open outside valve 51 towards outlet 90. The gas exits at port outlet 90 as a gas at the appropriate temperature. In one embodiment, the appropriate temperature is about 70° F.

Figure 7:
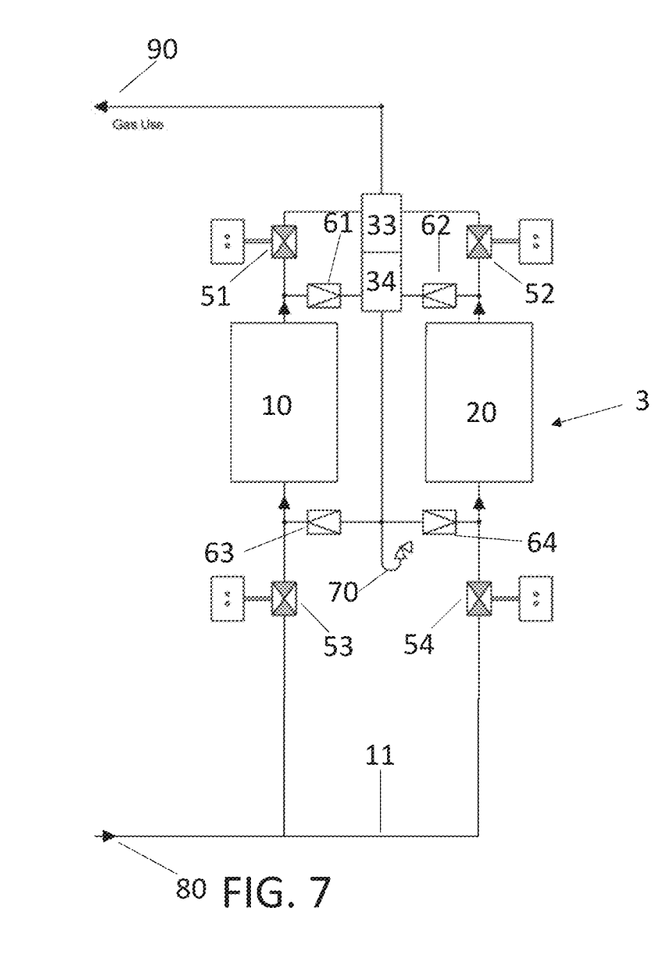
FIG. 7 is a schematic illustration of another embodiment of a vaporizer system of the current disclosure.

A third embodiment of the vaporizer system of the current disclosure is indicated in general at 3 in FIG. 7. Vaporizer system 3 has a first vaporizer 10 and a second vaporizer 20. Although two vaporizers are shown, more vaporizers can be included in vaporizer system 3.

Vaporizer system 3 includes piping 11 connecting various components of the system. The piping can be of any suitable material for handling the range of temperatures, including, but not limited to metals or plastics. In certain embodiments, the piping may be insulated. The cross-sections of this pipe and other structures can have various shapes, such as a circle, ellipsis, square, triangle, pentagon, hexagon, polygon, and other shapes. The piping includes an inlet port 80 and an outlet port 90. Although specific detail is not shown in the figures, both pipe inlet and outlet ports 80 and 90 can feature a number of specific fittings. For instance, each other may comprise a removable and reusable seal. Each outlet may also include a valve or vent.

Vaporizer system 3 includes a number of valves including inner valves 61, 62, 63, and 64 and outer valves 51, 52, 53 and 54. The inner and outer valves can be a number of different types of valves.

Inner valves 61, 62, 63 and 64 can be one-way valves or check valves, allowing fluid to flow in one direction. The valves can have two openings, one for fluid to flow in and one for it to flow out of. As shown in FIG. 7, valves 61 and 62 permit fluid to flow inward and valves 63 and 64 permit fluid to flow outward. Fluid will flow to one valve versus the other due to the pressure differentials across the valves. If there is higher pressure on the outlet side of the valve than on the inlet side, it will be closed. As examples only, the valves can be, but are not limited to, ball check valves, tilting disk check valves, swing-check or stop-check valves.

Outer valves 51, 52, 53 and 54 can be isolation valves, regulating the flow of fluid in a pipeline. The valve can function to start and stop the flow of liquid when desired. This function can be done by an open/closed setting. There are a number of different types of isolation valves that can be used. As examples only, the isolation valves may be, but are not limited to, globe valves, ball valves and gate valves. In certain embodiments, globe valves are utilized.

Vaporizer system 3 also includes at least one trim heater. Preferably, as shown in FIG. 7, vaporizer system 3 includes at least two trim heaters 33 and 34. The trim heaters 33 and 34 can be positioned along a portion of the piping 11 between vaporizers 10 and 20. As shown in the embodiment of FIG. 7, the trim heaters may be between outer valves 51 and 52 and inner valves 61 and 62. Trim heaters 33 and 34 can be any effective heater type. The trim heaters can be electric, gas, air or liquid based heaters. In one embodiment of the current disclosure, the heaters are electric heaters.

Vaporizer system can also include one or more line safety devices 70. Line safety device 70 may be a vent or valve system activated when pressure within the system builds up and requires a release. These vents or valves can be located along the vaporizer system at various points and in the case of vents can vent directly to the atmosphere or directed through additional piping for further processing.

A control system may include a controller and optionally various sensors (such as pressure and temperature sensors) positioned on or in the system. The controller may be utilized to control various parts of the vaporizer system such as the trim heaters, valves, inlet ports, and outlet ports of the vaporizer system. The controller may be wired or wireless and is in communication with the optional sensors and those portions of the systems that it controls. The controller includes a processor or other computer device and can be programmable so as to regulate or initiate processes upon certain events or status information Including placing the system in the configurations described below. The controller may also provide information such as historical data or various types of indications to a user.

Although not shown in the figures, a cryogenic tank or tanks may be connected at inlet port 80 to serve as a liquid source and a gas destination. The cryogenic tank may store a variety of cryogenic liquids. For example, the cryogenic liquids can be at least one of nitrogen, helium, neon, argon, krypton, carbon dioxide, hydrogen, liquefied natural gas and oxygen, although other types of gases are within the scope of this disclosure. In a preferred embodiment cryogenic tank is used for storing liquefied natural gas. The cryogenic tank supplies cryogenic liquid to the inlet port 80 and the vaporizer system can direct a resulting use gas to a process or use device through the outlet port 90.

Inlet and outlet ports 80 and 90 of vaporizer system 3 may be connected to the cryogenic tank or tanks (or other liquid source) and/or use device(s) by flexible hoses. As an alternative to flexible hoses, pipes of the system may be connected to tanks, process(es) and/or use devices by any other known connection means, including, but not limited to, insulated piping. The connection means may be permanent or temporary and can consist of any piping, tube, hose or appropriate conduit. In addition, the inlet and outlet ports 80 and 90 of the vaporizer system 3 can be connected to tank(s), use device(s) and/or process(es) by lines that include one or more valves to direct fluid.

Vaporizer system 3 may include devices or gauges for reading different characteristics of the tank. These devices or gauges can show pressure, temperature, differential pressure, liquid level, etc. The devices or gauges can be in communication with the controller and trigger actions upon certain levels or readings.

Figure 8:
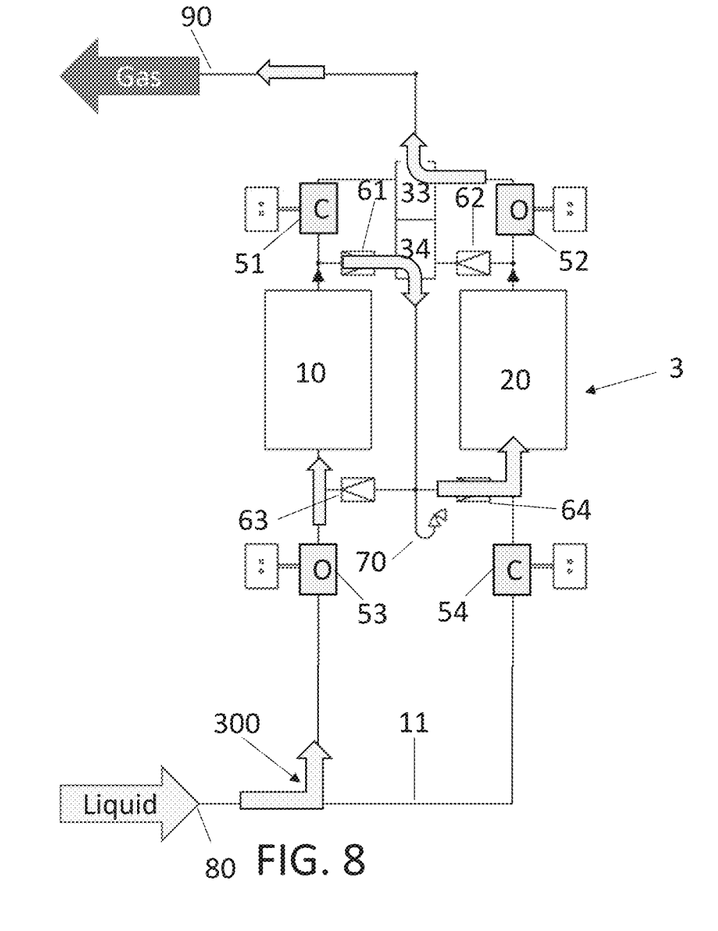
FIG. 8 is a schematic illustration of one embodiment of a defrosting operation of the vaporizer system of FIG. 7 of the current disclosure.

FIG. 8 illustrates a first defrosting configuration of the vaporizer system 3 of the current disclosure, with the direction of fluid shown by the arrows 300. Valves 51 and 54 are closed. When vaporizer 20 needs to be defrosted and liquid converted to gas, a liquid source (such as a cryogenic liquid tank) provides liquid at inlet port 80. The liquid passes through piping 11 and open outside valve 53 to vaporizer 10. The liquid is vaporized and becomes gas through vaporizer 10 and is directed through inside valve 61 toward trim heater 34. Gas is heated at trim heater 34 and passes through inside valve 64 to vaporizer 20. The warmed gas defrosts vaporizer 20 and flows through open outside valve 52 towards outlet 90. The gas may pass through trim heater 33 and exit at port outlet 90 as a gas at the appropriate temperature. In one embodiment, the appropriate temperature is about 70° F.

Figure 9:
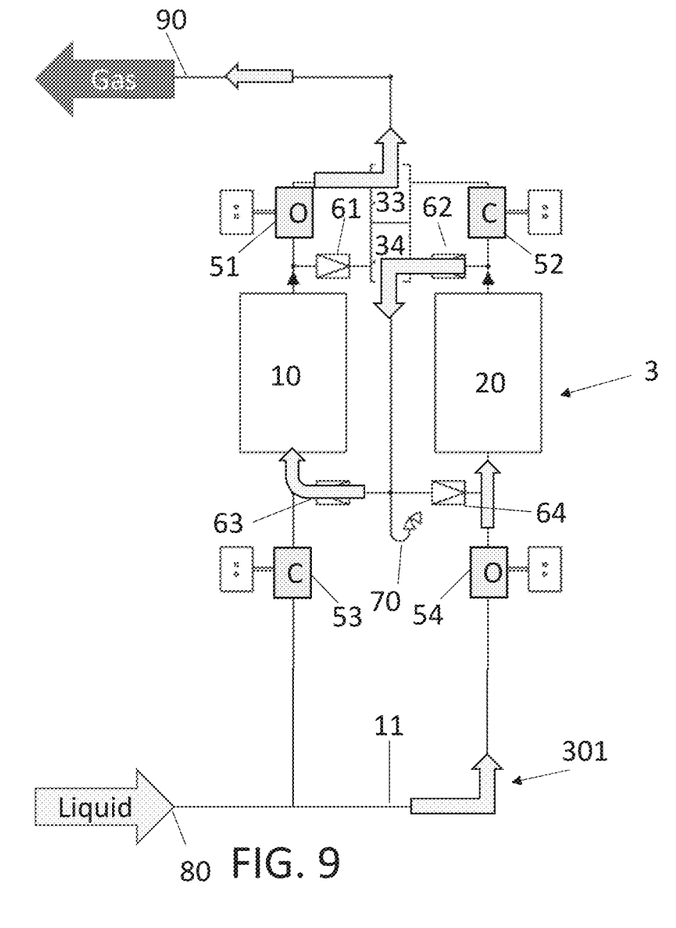
FIG. 9 is a schematic illustration of one embodiment of a defrosting operation of the vaporizer system of FIG. 7 of the current disclosure.

FIG. 9 illustrates a second defrosting configuration of the vaporizer system 3 of the current disclosure, with the flow of fluid shown by the arrows 301. Valves 52 and 53 are closed. When vaporizer 10 needs to be defrosted and liquid converted to gas, liquid source provides liquid at inlet port 80. The liquid passes through piping 11 and open outside valve 54 to vaporizer 20. The liquid is vaporized and becomes gas through vaporizer 20 and is directed through inside valve 62 toward trim heater 34. Gas is heated at trim heater 34 and passes through inside valve 63 to vaporizer 10. The warmed gas defrosts vaporizer 10 and flows through open outside valve 51 towards outlet 90. The gas may pass through trim heater 33 and exit at port outlet 90 as a gas at the appropriate temperature.

While the preferred embodiments of the disclosure have been shown and described, it will be apparent to those skilled in the art that changes and modifications may be made therein without departing from the spirit of the disclosure, the scope of which is defined by the following claims.

What is claimed is:
1. A vaporizer system, comprising:
a first vaporizer having a first vaporizer inlet and a first vaporizer outlet;
a second vaporizer having a second vaporizer inlet and a second vaporizer outlet;
a plurality of valves including first and second vaporizer inlet valves, first and second vaporizer outlet valves, first and second vaporizer inlet check valves and first and second vaporizer outlet check valves;

piping configured to transfer fluid from an inlet port to an outlet port with a portion of the piping between the first and second vaporizer, said piping including:
- a first vaporizer inlet line having the first vaporizer inlet valve positioned therein and extending from the inlet port to the first vaporizer inlet;
- a second vaporizer inlet line having the second vaporizer inlet valve positioned therein and extending from the inlet port to the second vaporizer inlet;
- a first vaporizer outlet line having the first vaporizer outlet valve positioned therein and extending from the first vaporizer outlet to the outlet port;
- a second vaporizer outlet line having the second vaporizer outlet valve positioned therein and extending from the second vaporizer outlet to the outlet port;
- an inlet crossover line connected between the first and second vaporizer inlet lines with the first and second vaporizer inlet check valves positioned therein;
- an outlet crossover line connected between the first and second vaporizer outlet lines with the first and second vaporizer outlet check valves positioned therein;
- a trim heater line connected between the inlet and outlet crossover lines;

at least one trim heater positioned within the trim heater line;

said first vaporizer inlet check valve positioned between an outlet of the trim heater line and the first vaporizer inlet line, and configured to allow fluid to flow from the outlet of the trim heater line to the first vaporizer inlet line;

said second vaporizer inlet check valve positioned between the outlet of the trim heater line and the second vaporizer inlet line, and configured to allow fluid to flow from the outlet of the trim heater line to the second vaporizer inlet line;

said first vaporizer outlet check valve positioned between the first vaporizer outlet line and an inlet of the trim heater line, and configured to allow fluid to flow from the first vaporizer outlet line to the inlet of the trim heater line;

said second vaporizer outlet check valve positioned between the second vaporizer outlet line and the inlet of the trim heater line, and configured to allow fluid to flow from the second vaporizer outlet line to the inlet of the trim heater line;

and wherein the first and second vaporizer inlet valves and the first and second vaporizer outlet valves may be placed in a first configuration where vapor from the first vaporizer is heated and directed to the second vaporizer so that the second vaporizer is defrosted and a second configuration where vapor from the second vaporizer is heated and directed to the first vaporizer so that the first vaporizer is defrosted.

2. The vaporizer system of claim 1, further comprising an additional heater positioned downstream of the first and second vaporizers.

3. The vaporizer system of claim 1, wherein the first and second vaporizer inlet valves and the first and second vaporizer outlet valves are globe valves.

4. The vaporizer system of claim 1, wherein the first vaporizer is an ambient air vaporizer.

5. The vaporizer system of claim 1, wherein the second vaporizer is an ambient air vaporizer.

6. The vaporizer system of claim 1, wherein the first and second vaporizers are ambient air vaporizers.

7. The vaporizer system of claim 1, further comprising a safety vent device provided on the outlet crossover line between the first and second vaporizer outlet check valves.

* * * * *